March 2, 1937. A. R. WURTELE 2,072,437
INTERNAL COMBUSTION ENGINE
Filed Jan. 6, 1933 2 Sheets-Sheet 1
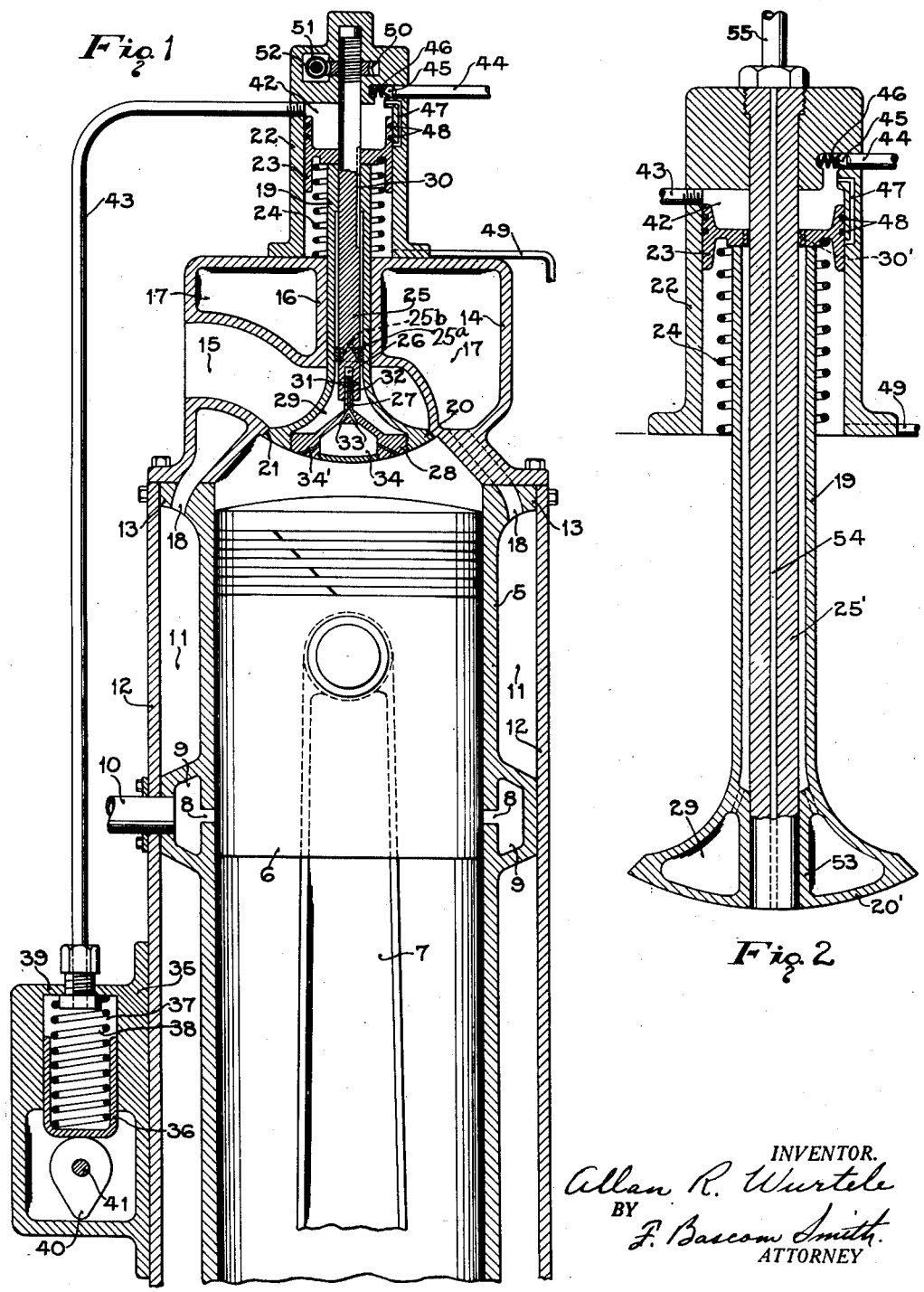

March 2, 1937.                A. R. WURTELE                2,072,437
                       INTERNAL COMBUSTION ENGINE
                          Filed Jan. 6, 1933            2 Sheets-Sheet 2

INVENTOR.
Allan R. Wurtele
BY
L. Bascom Smith
ATTORNEY

Patented Mar. 2, 1937

2,072,437

UNITED STATES PATENT OFFICE 2,072,437

INTERNAL COMBUSTION ENGINE

Allan R. Wurtele, New Roads, La.

Application January 6, 1933, Serial No. 650,444

12 Claims. (Cl. 123—90)

This invention relates to internal combustion engines, and more particularly to valve apparatus therefor and a method of operating the same.

One of the objects of the present invention is to provide common actuating and cooling means for internal combustion engine valves.

The accompanying drawings and the detailed specification to follow are directed chiefly to Diesel engine construction in view of the fact that many attempts are now being made to simplify the construction, reduce the costs, and increase the reliability of Diesel type engines. These engines have heretofore been burdened with complicated valve gear which is slow acting, troublesome and noisy. The necessary valve gear and complications incident thereto have rendered double acting, two-cycle Diesel engines impracticable.

Another object of this invention is, therefore, to provide novel valve actuating mechanism whereby the above noted difficulties are overcome.

Still another object is to provide novel means whereby a common fluid is employed for actuating and cooling an engine valve.

A further object is to provide novel valve actuating mechanism in combination with an internal combustion engine which is so constructed that the cam shaft may be of greatly reduced length.

A still further object is to provide novel means adapted to simultaneously actuate an engine valve, cool said valve and deliver a combustible into the combustion chamber of an internal combustion engine.

Another object is to provide a novel method of operating a valve of an internal combustion engine.

The above and further objects and novel features of this invention will more fully appear in the following detailed description when taken in connection with the accompanying drawings. It is to be expressly understood, however, that the drawings are for the purpose of illustration only and are not designed as a definition of the limits of the invention, reference being primarily had for this purpose to the appended claims.

In the drawings wherein like reference characters refer to like parts throughout the several views:

Fig. 1 is an end elevation, in section and with parts broken away, of an internal combustion engine illustrating one embodiment of the present invention;

Figs. 2, 3 and 4 are detail views in section and with parts broken away showing other forms of valves which may be employed in carrying out the present invention;

Figure 3:
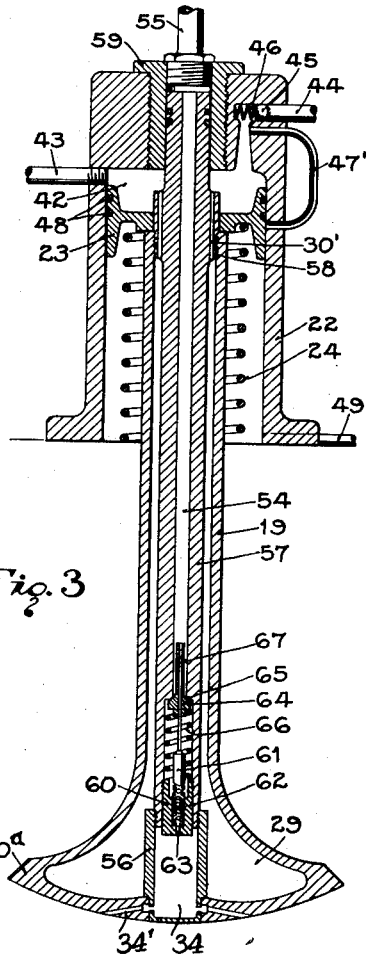

A preferred embodiment of the present invention is illustrated in Fig. 1 by way of example in combination with a two-cycle, port scavenging, valve-in-head Diesel type engine, only parts of which have been shown. In the illustrated form, the engine comprises a power cylinder 5 having a piston 6 therein, said piston being operatively connected by means of rod 7 to a crankshaft or crosshead, not shown. A series of circumferentially disposed ports 8 in the wall of cylinder 5 connect the latter with an air box 9 surrounding said cylinder. Ports 8 are adapted to be covered and uncovered by piston 6 as the latter reciprocates and air box 9 is in constant communication with a source of air supply (not shown), preferably under pressure through a conduit 10. A water jacket or cooling space 11 common to all cylinders may be provided by securing plates 12 in any suitable manner to outwardly extending, rectangular flanges 13 on cylinders 5.

The upper end of cylinder 5 has a cylinder head 14 secured thereto, said head being provided with a centrally disposed exhaust port, an exhaust gas passage 15 and a valve guide 16. A cooling medium may be circulated in the space 17 in the cylinder head and, as shown, passages 18 are provided in flange 13 for connecting said space with water jacket 11.

A novel hydraulically operated valve is provided through which fuel may be introduced into the power cylinder by the action of the valve itself, and wherein a common fluid is employed as an actuating and cooling medium, which fluid may be the engine fuel. In the form illustrated in Fig. 1, an exhaust valve is shown as comprising a hollow stem 19, free to rotate and slide in guide 16, and a flared head portion 20 which is adapted to seat upwardly against valve seat 21 to close the exhaust port in head 14. Stem 19 extends upwardly into an inverted cup-like housing 22 mounted on cylinder head 14 and has a piston 23, adapted to have a close sliding fit in said housing, secured to the upper end thereof for a purpose to be hereinafter described. Suitable means, such as spring 24, are interposed between piston 23 and cylinder head 14 for normally maintaining valve 19, 20 against seat 21.

Fuel pumping means are provided within the valve 19, 20, and as shown such means are constituted by a normally stationary spindle 25 adjustably suspended from the upper closed end of housing 22 in a manner to be hereinafter described in detail. Spindle 25 extends downwardly into the hollow center portion of valve stem 19, having a close sliding fit with the upper reduced bore of the latter. A guide ring 25a is interposed between the inner wall of stem 19 and spindle 25 to position the latter, said ring having one or more openings 25b therein to permit the passage of fuel. A cylindrical recess 26 countersunk in the lower end of the spindle receives an upwardly extending hollow stem or piston 27 of a mushroom shaped member 28 which is threadedly or otherwise suitably mounted in valve head 20 and constitutes a portion thereof. A cooling chamber or fuel reservoir 29 is thus formed within the valve 19, 20 by the inner walls thereof, spindle 25 and the upper surface of member 28 to which fuel may be supplied through grooves 30 cut in spindle 25 and by-passing piston 23.

Cylinder or recess 26 and piston 27 constitute a fuel pump, the former being normally stationary while the piston reciprocates with the opening and closing of valve 19, 20. As the latter is unseated by novel means to be hereinafter described, piston 27 moves downwardly in cylinder 26 uncovering a series of radial ducts 31 in the walls of said cylinder thereby placing the latter in communication with chamber 29 and permitting fuel to be forced into the same. As soon as ducts 31 are again covered on the closing movement of valve 19, 20, the fuel in cylinder 21 is pumped through a central passage 32 in piston 27 and diverging orifices 33, which constitute a spraying nozzle, into a precombustion chamber 34 formed in member 28, and subsequently into cylinder 5 through suitable orifices 34'.

Figure 5:
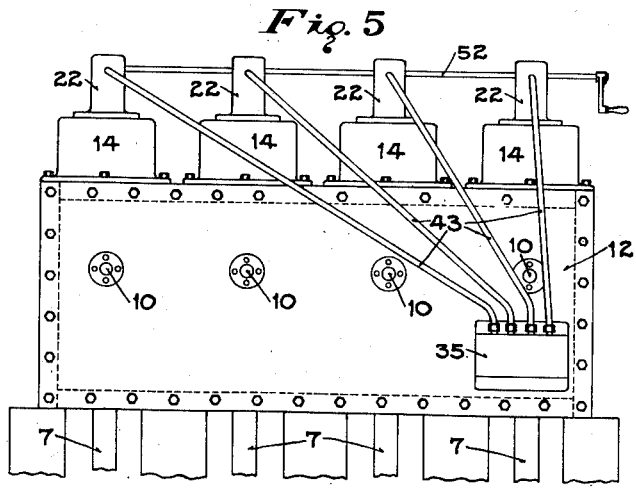
Fig. 5 is a diagrammatic side elevation of a multi-cylinder internal combustion engine embodying the invention.

Novel valve actuating means are provided whereby quick, positive valve action is attained, said means being simply and compactly constructed thereby rendering only a very short camshaft necessary in multi-cylinder engines. In the illustrated form, such means comprises a fluid pressure pump for each cylinder, all of said pumps in a multi-cylinder engine being mounted in a single compact housing 35 (Fig. 5). Each pump may be constituted by a cup-shaped plunger 36 having a close sliding fit in a cylindrical recess 37 in casing 35. Suitable means such as spring 38 interposed between plunger 36 and an inwardly extending flange 39 at the upper end of cylinder 37 are provided for holding plunger 36 against the surface of a cam 40 adapted to be mounted on a camshaft 41 for rotation therewith and to thereby reciprocate plunger 36 in cylinder 37. Shaft 41 may be rotatably driven from the engine crankshaft by suitable means, not shown.

A normally closed system filled with a suitable liquid fuel is provided between the fluid pressure pump described above and valve 19, 20, said system, as shown, comprising pump cylinder 37, space 42 above piston 23 in housing 22, conduit 43 connecting said pump cylinder and housing and valve chamber 29. It will thus be seen that when plunger 36 is moved upwardly by cam 40, pressure will be transmitted through the liquid fuel to piston 23 and the lower wall of chamber 29 thereby unseating valve 19, 20, and actuating fuel pump 26, 27, as pointed out above.

Means are provided for making up the fuel in system 37, 43, 42, 29 which is taken therefrom by fuel pump 26, 27 during each revolution of the engine and which is lost through unavoidable leakage. Preferably, such means are constituted by a fuel supply line 44 connected to space 42 at a point slightly higher than that at which pipe 43 enters said space. To prevent a loss of pressure in the valve actuating system due to backing up of the fuel in line 44 during periods of high pressure in said system, i. e., when valve 19, 20 is being opened, a suitable check valve, such as ball check valve comprising ball 45 and spring 46, is provided. A slight pressure sufficient to open valve 45 during periods of low pressure in chamber 42 is maintained in line 44, thus permitting fuel to enter the same after each operation of valve 19, 20.

Novel means are provided for bleeding air from the hydraulic valve actuating system which means, as shown, are constituted by a suitable passage 47 in the wall of housing 22. The upper end of said passage opens into chamber 42 at a point adjacent the top thereof while the lower end of said passage communicates with the interior of housing 22 at a point just below rings 48 provided on piston 23 when valve 19, 20 is in its closed position. While piston 23 is at the upper end of its stroke, any air accumulated in chamber 42 is free to pass through vent 47, by the skirt of piston 23 and out through conduit 49 which latter is subject to atmospheric pressure. As soon as pressure is built up in the valve actuating system, however, piston 23 moves downwardly, and any escape of fuel through vent 47 is prevented by the tight fitting piston rings 48. Any unavoidable leakage of fuel past the periphery of piston 23 is returned to the fuel supply tank (not shown) by conduit 49 communicating with the lowest portion of housing 22.

It will be noted than an excess volume of fluid in confined space 37, 43, 42, 29, which may result from expansion due to heating, is forced down through passage 47 under the pressure of spring 24. Any decrease in the volume of said fluid is, as pointed out above, made up from line 44. It is thus seen that the fluid volume is maintained constant and the valve action is thus uniform.

In order that the speed of the engine may be controlled under various load conditions, means are provided for varying the charge of fuel pumped into each cylinder of the engine during each revolution. In the form shown, such control is attained by changing the relative position of spindle 25 with respect to valve 19, 20, thereby varying the effective pumping stroke of fuel pump 26, 27, i. e., the stroke of piston 27 above ducts 31. Preferably, the means provided for adjusting the position of spindle 25 are constituted by an annular rack 50 which is threaded onto the upper end of said spindle and which meshes exteriorly with a worm 51 secured to a manually operable shaft 52 extending the length of the engine. Shaft 52 is rotatably supported and rack 50 is held in a fixed vertical position in the upper end of housing 22. Thus when rack 50 is actuated by turning worm 51, spindle 25 is moved up or down depending on the direction of rotation of shaft 52.

A cycle of operation is as follows: As piston 6 moves downwardly from the position shown in Fig. 1, the lobe of cam 40 becomes effective to raise plunger 36, thus creating a pressure in the valve actuating system. The contour of cam 40 is such that valve 19, 20 will be moved off its seat against the resilient efforts of spring 24 by fluid pressure acting on piston 23 at about the moment that ports 8 are uncovered by piston 6. Scavenging air under pressure enters cylinder 5 from air box 9 through ports 8 driving all exhaust gases out through passage 15. The instant before ports 8 are again covered by piston 6 on its up-stroke, plunger 36 rides down on cam 40 relieving the pressure on piston 23 and permitting valve 19, 20 to close under the pressure of spring 24. During the short interval between the closing of valve 19, 20, and the covering of ports 8, a charge of fresh air under pressure fills cylinder 5.

As the valve is opened in the above manner, piston 27 moves downwardly to a point below ducts 31 and fuel from chamber 29 rushes into cylinder 26. On the up or closing stroke of the valve, as soon as piston 27 has covered ducts 31, fuel from cylinder 26 is pumped through passage 32 and nozzle orifices 33 into precombustion chamber 34. As piston 6 nears the top of its stroke compressing the air in cylinder 5, the heat of compression becomes effective to ignite the fuel in chamber 34. The fuel thus started burning expands through ducts 34' whereby it is evenly distributed in the power cylinder 5 and complete burning is attained, moving piston 6 downwardly again, and the cycle is repeated.

A second embodiment of the invention is illustrated in Fig. 2 wherein common fluid other than the engine fuel is employed for actuating and cooling the valve. The construction differs from that shown in Fig. 1 in that valve head 20' has a central opening, and an integral guide 53. Spindle 25' is threadedly mounted in housing 22, the lower end of said spindle having a close sliding fit in guide 53. Fuel is pumped directly into the power cylinder through a central passage 54 in spindle 25' from a fuel supply line 55 coupled to the upper end thereof. Any suitable cooling fluid may be used in the valve actuating system, said fluid being pumped into chamber 42 in the same manner as above described in connection with the embodiment of Fig. 1 and permitted to circulate through valve stem 19 by means of openings 30' in piston 23.

Another embodiment of the invention, as shown in Fig. 3, is constituted by a valve having a tubular stem 19 and an integral hollow head portion 20a. A cup-shaped member 56 constituting a precombustion chamber 34 is mounted within valve head 20a, the reduced lower portion of said member having a snug fit in the opening in the face of the valve. Communication between chamber 34 and the engine cylinder is established through orifices adjacent the lower end of member 56 which register with passages 34' in the valve face. A hollow spindle 57 extends into stem 19 and is detachably secured as by means of screw threads to cup 56 while an enlarged portion 58 near the upper end thereof threadedly engages the upper end of stem 19, thereby forming, with the inner walls of the valve, cooling chamber 29 which communicates with chamber 42 through passages 30' in an enlarged portion 58 of spindle 57. Since spindle 57 is adapted to reciprocate with valve 19, 20a, the upper extremity thereof has a sliding fit in a central opening in a bushing 59 threaded into the upper end of housing 22, said plug having fuel supply line 55 coupled thereto in any suitable manner. The air vent, as illustrated in this embodiment, is constituted by a small pipe 47' which fits into openings in housing 22 communicating with chamber 42 at the same points as passage 47 in Fig. 1.

Fuel spraying means are provided within the member 57 and, in the form shown, such means comprises a fuel injection nozzle constituted by a thimble 60, threaded into an enlarged bore in the lower end of member 57, and a spindle 61 having a plurality of spiral grooves 62 which communicate with a small orifice 63 in the lower end of thimble 60. A suitable check valve 64 is normally held in engagement with a seat 65 in member 57 by means of a spring 66. Valve 64 is shown with a hollow stem 67 extending upwardly into the bore of member 57 and serves as a guide for the upper reduced end portion of nozzle spindle 61. Longitudinal grooves may be provided in the outer periphery of the stem of valve 64 to permit the passage of fuel when the valve is moved off its seat by pressure in line 55.

Figure 4:
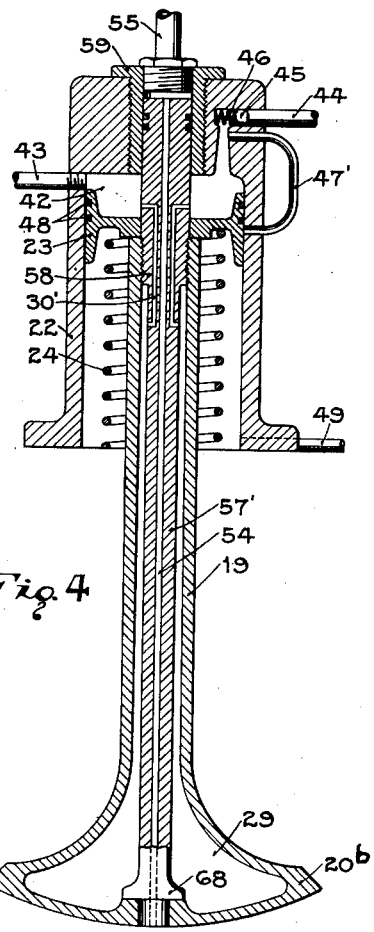

A fourth embodiment illustrated in Fig. 4 is similar to that shown in Fig. 3 except that the fuel spraying means have been eliminated and member 57' extends downwardly and has a snug fit in the opening in valve head 20b, a shoulder 68 being provided on member 57' adapted to engage the interior of the valve face about said opening. A small fuel passage 54 extends the entire length of member 57', thereby connecting supply pipe 55 with the combustion chamber of the engine cylinder.

It will be noted that the operation of the embodiments shown in Figs. 2, 3 and 4 is substantially the same as that set out above for the embodiment of Fig. 1. The only difference in operation lies in the fact that fuel is pumped into the power cylinder or precombustion chamber by external means (not shown) and a separate fluid is employed for cooling and actuating the valve. In these latter embodiments, fuel may be injected into the power cylinder or precombustion chamber at any desired instant.

Figure 6:
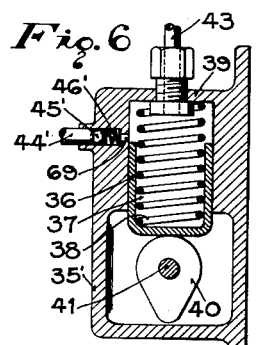
Fig. 6 is a sectional detail view, with parts broken away showing an alternative construction which may be employed in carrying out the present invention.

If desired, the fuel or cooling medium makeup lines of any of the foregoing embodiments of the invention may communicate directly with the casing of the fluid pressure pump in lieu of the connections to casing 22 described above. In this form, a line 44' (Fig. 6) is threaded or otherwise tightly fitted into passage 69 in the side of pump housing 35', which passage communicates with cylinder 37 at a point adjacent the upper edge of piston 36 when the latter is in its lowest position. A ball check valve comprising a ball 45' and spring 46' is provided in passage 69 for preventing any loss of pressure in the valve actuating system due to the backing up of fluid in line 44' during intervals of high pressure in said system. The covering of passage 69 by piston 36 on its up stroke serves as an aid to valve 45', 46', in preventing such loss of pressure. It will be noted that the construction of casing 22 will thereby be simplified and the necessary piping in multi-cylinder engines will be considerably reduced by the use of the latter described arrangement since a single makeup line may lead directly to pump casing 35 with very short branches extending from said line to the individual cylinders of said casing.

There is thus provided a novel valve and valve operating assembly for internal combustion engines, whereby costly and troublesome valve gear is eliminated, and a simple and compact valve operating system substituted therefor. There is further provided a novel combination of elements wherein the fuel employed in the operation of the engine or other suitable fluid may be employed for both cooling and actuating a valve. The hydraulic operating system herein provided is so constructed that the length of the required cam shaft is greatly reduced and, due to the large working surface of the liquid therein, quick and positive valve action is attained. Novel means have also been provided for bleeding air from a hydraulic valve operating system. It is pointed out further that the novel valve operating means herein provided permit the installation of valves at any desired angle and will thus render practical the construction of double-acting, two-cycle Diesel engines.

While there has been shown and described only four embodiments of the invention, it is to be expressly understood that the same is not limited thereto but that various changes may be made in the mechanical details and arrangement of parts illustrated without departing from the spirit of the invention. Reference will primarily be had to the appended claims for a definition of the limits of the invention.

What is claimed is:

1. The combination with an internal combustion engine of a valve having a stem with a fuel passage and a cooling chamber therein, resilient means for seating said valve, and hydraulic means including a pump for moving said valve off its seat, the fluid in said hydraulic means being adapted to circulate in said cooling chamber.

2. In an internal combustion engine, a power cylinder, a cylinder head therefor having a port therein, a valve for said port having a tubular stem, a fuel pump within said valve adapted to be actuated by the movements of the latter, hydraulic means employing an engine fuel as a pressure transmitting medium for actuating said valve, and means for circulating said fuel in said valve and for delivering the same to said pump.

3. In apparatus of the class described, a cylinder having a port, a valve for said port having a chamber therein, means for injecting a fuel into said cylinder through said valve, means for circulating a cooling medium through said chamber, and fluid pressure pump means for subjecting said cooling medium to pulsating pressure whereby said valve is moved to open position.

4. In an internal combustion engine, a valve, means including a liquid pressure chamber and a liquid fuel therein for operating said valve, and means for introducing the liquid fuel from the liquid pressure chamber of said first named means through said valve into a combustion space in the engine.

5. In an internal combustion engine, hydraulic valve actuating apparatus comprising a fluid casing, means for subjecting the fluid in said casing to pulsating pressure, a piston in said casing operatively connected to a valve of said engine, rings on said piston, and means for bleeding air from said casing comprising a passage opening at one end from a region of air accumulation in said casing and reentering said casing at a point adjacent the atmospheric side of said rings during periods of low pressure in said casing.

6. In an internal combustion engine the combination of a cam-operated pump having a plunger, a hydraulic fluid casing, a piston in said casing rigidly connected to a valve, said valve having a hollow stem in communication with said casing, means including a pipe connection between said pump and casing for confining a fluid between said plunger and piston, said pump exerting a pulsating pressure upon said fluid for moving said piston relatively to said casing whereby said valve is moved to open position, and pump means within said valve for injecting fluid from the hollow stem through the face of the valve.

7. In an internal combustion engine, a hydraulic fluid cylinder, a poppet valve having a hollow stem extending into said cylinder, a piston secured to said stem and having a sliding fit in said fluid cylinder, connecting means between said fluid cylinder and the chamber in said valve stem, fluid pressure pump means for subjecting the fluid in said cylinder to pulsating pressure for opening said valve, yielding means for closing said valve, and pump means within the valve for injecting fluid from the hollow valve stem into a combustion chamber of the engine.

8. In apparatus of the class described, a valve having a chamber therein, hydraulic means employing a liquid fuel as a pressure transmitting medium for opening said valve, means for introducing said liquid in said chamber to cool said valve, and means for introducing said liquid fuel from said chamber into a combustion space.

9. In an internal combustion engine a power cylinder, a cylinder head having a port, a valve for said port having an enlarged head and a hollow stem, hydraulic means for moving said valve to open said port, the fluid chamber of said means being in communication with said hollow stem whereby said valve is cooled, and means in said valve operative by the closing movement of the latter for injecting a charge of said fluid into said power cylinder.

10. In an internal combustion engine, a power cylinder having a port, a valve for controlling the flow of gases through said port, hydraulic means including a fluid pressure pump and a liquid fuel for operating said valve, and means for introducing said liquid fuel through said valve into said power cylinder.

11. In an internal combustion engine, a valve, means employing a liquid fuel for opening said valve, said valve having a chamber therein in communication with said last named means, pump means within the valve for introducing a liquid fuel from said chamber into a combustion space of the engine, and resilient means for closing the valve.

12. The combination with an internal combustion engine of a valve, fluid pressure means including a liquid pressure chamber and employing liquid fuel for opening said valve, means for introducing the liquid fuel from said liquid pressure chamber through the valve into a combustion space of the engine, and resilient means for closing said valve.

ALLAN R. WURTELE.